United States Patent
Nagumo (10) Patent No.: US 11,821,494 B2
(45) Date of Patent: Nov. 21, 2023

(54) FRICTION TRANSMISSION DEVICE

(71) Applicant: SUMITOMO HEAVY INDUSTRIES, LTD., Tokyo (JP)

(72) Inventor: Toshiya Nagumo, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/050,876

(22) Filed: Oct. 28, 2022

(65) Prior Publication Data

US 2023/0070415 A1    Mar. 9, 2023

Related U.S. Application Data

(63) Continuation of application No. PCT/JP2021/001977, filed on Jan. 21, 2021.

(30) Foreign Application Priority Data

May 20, 2020 (JP) ................................. 2020-087889

(51) Int. Cl.
 *F16H 15/50* (2006.01)
(52) U.S. Cl.
 CPC .................................. *F16H 15/503* (2013.01)
(58) Field of Classification Search
 CPC .............................................. F16H 15/50–52
 See application file for complete search history.

(56) References Cited

U.S. PATENT DOCUMENTS

| 2,929,273 A | * | 3/1960 | Weber ..................... F16H 15/52 475/194 |
|---|---|---|---|
| 4,593,574 A | | 6/1986 | Sinn et al. |
| 10,400,872 B2 | | 9/2019 | Lohr |
| 2016/0290451 A1 | | 10/2016 | Lohr |

FOREIGN PATENT DOCUMENTS

| JP | 63-251656 | | 10/1988 |
|---|---|---|---|
| JP | 2003-227556 A | | 8/2003 |
| JP | 2014214838 A | * | 11/2014 |
| JP | 2018-512545 A | | 5/2018 |

OTHER PUBLICATIONS

PCT International Search Report of PCT/JP2021/001977 dated Mar. 23, 2021 by Japan Patent Office.

* cited by examiner

*Primary Examiner* — Erin D Bishop
(74) *Attorney, Agent, or Firm* — WTA Patents (57) ABSTRACT

A friction transmission device has a friction transmission mechanism that transmits power by contact between a take-out member from which output rotation is taken out and a plurality of friction rolling elements. The take-out member has a contact surface inclined with respect to an axial direction. The device includes an output member that is used to transmit the output rotation to a driven device, and a coupling that connects the take-out member and the output member to each other. The coupling is configured to be more easily deformed than the take-out member and the output member with respect to an axial load, and has a function of absorbing deviation of an axial center between the take-out member and the output member and a function of converting a torque acting on the output member into an axial force to transmit the axial force to a take-out member side.

7 Claims, 10 Drawing Sheets

FRICTION TRANSMISSION DEVICE

CROSS-REFERENCE TO RELATED APPLICATIONS

This is a bypass continuation of International PCT Application No. PCT/JP2021/001977 filed on Jan. 21, 2021, which claims priority to Japanese Patent Application No. 2020-087889 filed on May 20, 2020, which are incorporated by reference herein in their entirety.

BACKGROUND

Technical Field

A certain embodiments of the present invention relates to a friction transmission device.

Description of Related Art

The related art discloses an automatic transmission having a speed change mechanism in which a rolling element is provided between an input-side transmission member and an output-side transmission member, and an output-side transmission mechanism configured between the output-side transmission member and an output shaft. This speed change mechanism is configured to revolve the rolling element while rotating the rolling element by the rotation force from the input-side transmission member and transmit the revolution component of the rolling element to the output-side transmission member. The output-side transmission mechanism is composed of an engagement recessed portion formed in the output-side transmission member, an engagement recessed portion formed in the output shaft, and a plurality of engagement balls interposed between these engagement recessed portions. The rotation transmitted to the output-side transmission member is transmitted to the output shaft via a plurality of engagement balls.

SUMMARY

According to an embodiment of the present invention, there is provided a friction transmission device having a friction transmission mechanism that transmits power by contact between a take-out member from which output rotation is taken out and a plurality of friction rolling elements, the take-out member having a contact surface inclined with respect to an axial direction, and having an output member that is used to transmit the output rotation to a driven device, and a coupling that connects the take-out member and the output member to each other. The coupling is configured to be more easily deformed than the take-out member and the output member with respect to an axial load, and has a function of absorbing the deviation of the axial center between the take-out member and the output member and a function of converting the torque acting on the output member into an axial force to transmit the axial force to a take-out member side.

In addition, any combinations of the above-described components and mutual substitutions of the components and expressions of the present invention between methods, systems, and the like are also effective as aspects of the present invention.

According to the present invention, it is possible to provide the friction transmission device capable of reducing the influence of an external load.

DETAILED DESCRIPTION

In friction transmission devices, when an external load such as a tilting moment, a radial load, or an axial load acts on an output portion, the posture of an output-side member of a speed change mechanism changes, and the speed change characteristics of the speed change mechanism change. From the viewpoint of obtaining stable speed change characteristics, it is desirable to reduce the influence of the external load on the speed change mechanism. However, the automatic transmission described in the related art has not been able to sufficiently cope with this viewpoint.

The present invention is to provide a friction transmission device capable of reducing the influence of an external load in view of such a circumstance.

The outline of the present disclosure will be described. The present inventor has studied a friction transmission device and obtained the following findings. As the friction transmission device, a configuration having a friction transmission mechanism including a take-out member having a contact surface inclined with respect to an axial direction and taking out output rotation by contact between the contact surface and a plurality of friction rolling elements, an output member for transmitting the output rotation to a driven device, and a coupling that connects the take-out member and the output member is considered. In this friction transmission device, it was found that an external load acting on the output member and the magnitude of the transmission torque influences the characteristics of the friction transmission mechanism.

First, the influence of the external load will be described. It is considered that external loads such as a tilting moment, a radial load, and an axial load act on the output member connected to the take-out member. When the external loads act on the output member, the output member is displaced or deformed, and misalignment (positional deviation) occurs in the take-out member connected to the output member. When the misalignment occurs in the take-out member, bias occurs in a contact load carried by each of the plurality of friction conductors. In a portion where the contact load between the friction conductor and each raceway ring is excessive, metal fatigue increases, which causes shortening of the life. Additionally, in a portion where the contact load is too small, idling occurs and unevenness occurs in the transmission characteristics of the friction transmission mechanism.

From the viewpoint of reducing the misalignment of the take-out member, it is important that the coupling is configured to be more easily deformed than the take-out member and the output member with respect to an axial load. Since the coupling has easy deformability, in a case where a tilting moment has acted on the output member, the influence of the tilting moment is absorbed by elastic deformation such as bending of the coupling. Therefore, the influence on the take-out member can be reduced.

Additionally, from the same viewpoint, it is important that the coupling has a function of absorbing the deviation of the axial center between the take-out member and the output member (hereinafter referred to as "axial center deviation absorption function"). In this case, since the axial center deviation between the take-out member and the output member is absorbed by the coupling, the influence of the deviation of the axial center on the take-out member can be reduced.

Next, the influence of the magnitude of the transmission torque will be described. The magnitude of a pressurization load applied between the friction conductor and the take-out member has the following influences on characteristics such as the efficiency, torque capacity, and life of the friction transmission device.

(1) In a case where the pressurization load is large, the upper limit of the transmission torque is large, but the transmission efficiency degrades and the life also decreases.
(2) In a case where the pressurization load is small, the upper limit of the transmission torque is small, but the transmission efficiency is enhanced and the life also increases.

From the viewpoint of ensuring the transmission efficiency and the life, it is desirable that the pressurization load is appropriately set according to the magnitude of the transmission torque. However, since the pressurization load is adjusted with the accuracy of micron unit similar to a general rolling bearing, it is not easy to finely adjust the pressurization load to a desired load. Additionally, in applications in which the transmission torque changes over a wide range, it is considered to set the pressurization load in conformity with the maximum value of the transmission torque. In this case, in a case where an operation is performed in a state in which the transmission torque is small, the efficiency and the life decrease as compared to the case of a pressurization load suitable for a small torque.

From these, in order to automatically adjust the pressurization load according to the magnitude of the transmission torque, it is important for the coupling to have a function of converting the torque acting on the output member into an axial force and transmitting the converted axial force to the take-out member side (hereinafter, referred to as a "torque pressurization conversion function"). In this case, the transmission torque acting on the output member is converted into the axial force by the coupling and the axial force is transmitted to the take-out member. Therefore, when the transmission torque is small, the contact load (pressurization load) between the friction rolling element and the take-out member becomes smaller, and the decrease in efficiency and life can be suppressed. Additionally, when the transmission torque is large, the contact load (pressurization load) between the friction rolling element and the take-out member increases, and shortage of the transmission torque capacity can be compensated.

The above-described axial center deviation absorption function and torque pressurization conversion function can be realized by various configurations. Hereinafter, an exemplary configuration will be described in detail with reference to the embodiment.

Hereinafter, the present invention will be described with reference to the respective drawings on the basis of the preferred embodiments. In the embodiments and modification examples, the same or equivalent components and members will be designated by the same reference numerals, and redundant descriptions will be omitted as appropriate. Additionally, the dimensions of the members in the respective drawings are appropriately shown in an enlarged or reduced manner for easy understanding. Additionally, in the respective drawings, some of the members that are not important for explaining the embodiments will be omitted.

Additionally, terms including ordinal numbers, such as first and second, are used to describe various components. However, the terms are used only for the purpose of distinguishing one component from another component, and the components are not limited by the terms.

Embodiment

Figure 1:
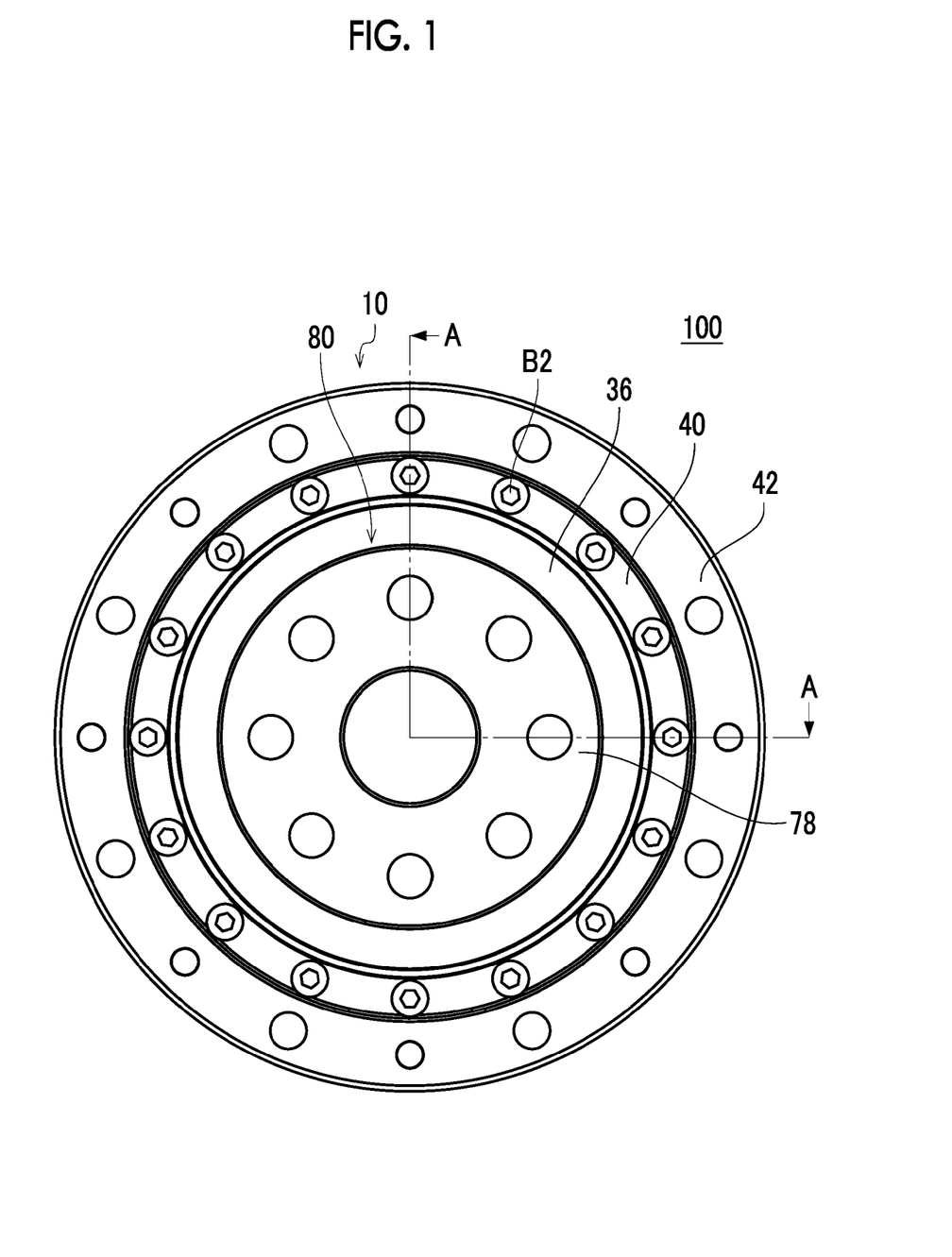
FIG. 1 is a front view schematically showing an example of a friction transmission device according to an embodiment.
Figure 2:
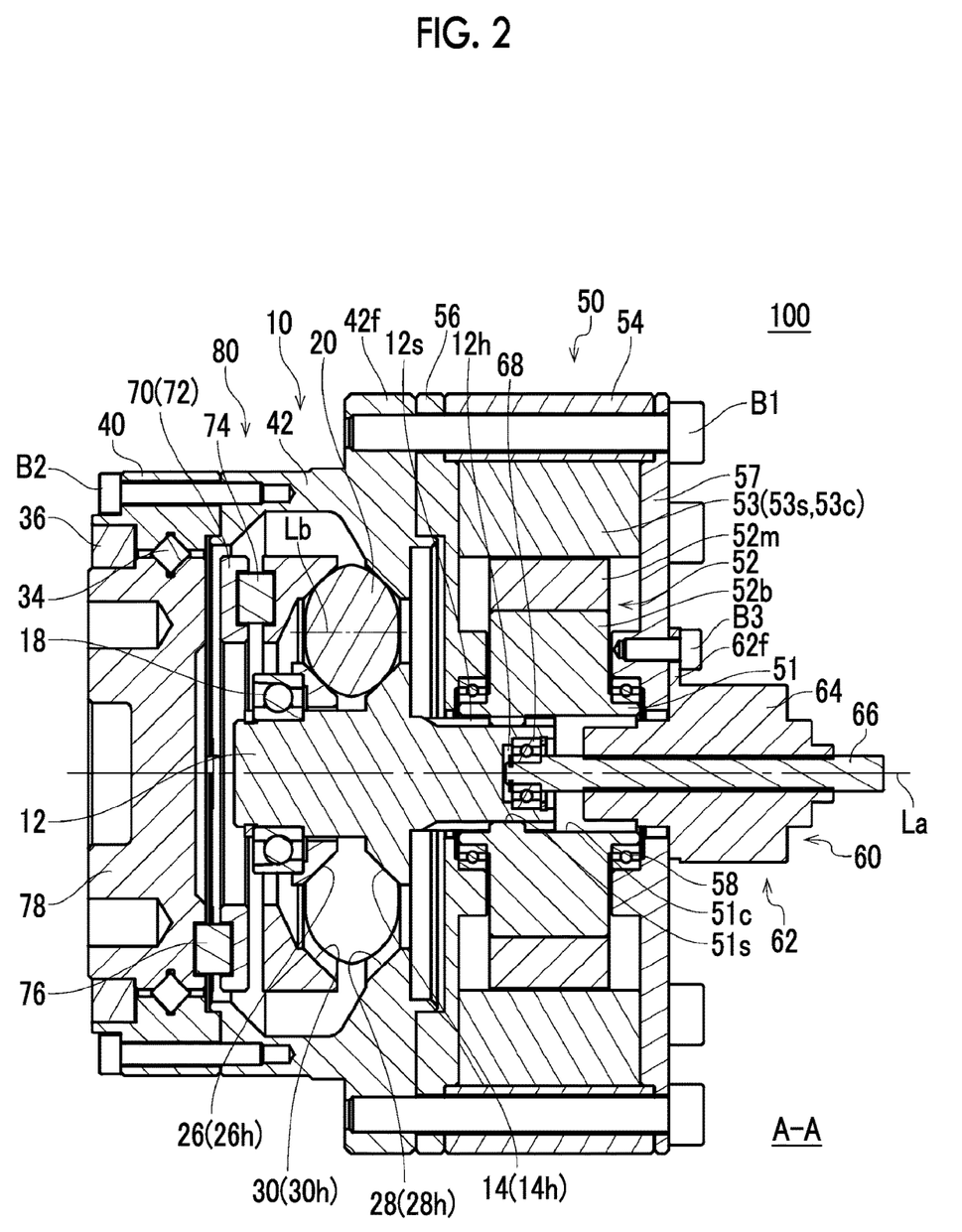
FIG. 2 is a sectional view showing a section of the friction transmission device of FIG. 1 along line A-A.

Hereinafter, the configuration of a friction transmission device 100 according to an embodiment of the present disclosure will be described with reference to FIGS. 1 and 2. FIG. 1 is a front view schematically showing an example of the friction transmission device 100 according to the present embodiment. FIG. 2 is a sectional view schematically showing the friction transmission device 100. This figure shows a section along line A-A of FIG. 1.

The friction transmission device 100 of the present embodiment includes a friction transmission mechanism 10 and an output-side mechanism 80. The friction transmission mechanism 10 transmits input power by the contact between a plurality of friction rolling elements and a take-out member. The output-side mechanism 80 transmits the output rotation taken out to the take-out member to a driven device (not shown). In particular, the output-side mechanism 80 includes the take-out member, an output member, and a coupling that connects the take-out member and the output member to each other and reduces the influence of an external load acting on the output member from the driven device on the take-out member. First, the friction transmission mechanism 10 will be described, and the output-side mechanism 80 will be described below.

Friction Transmission Mechanism

In the friction transmission mechanism 10, the take-out member may have a friction surface (also a raceway surface) of each friction rolling element, and the friction surface may be a surface inclined with respect to a center axis, not just a cylindrical surface. The friction transmission mechanism 10 of the present embodiment is a mechanism that changes the speed of the rotation input from a motor 50 and transmits the input rotation to the output-side mechanism 80. In particular, the friction transmission mechanism 10 is configured to cause the friction rolling element to rotate and revolve by rotating an input raceway ring, and output the generated rotational component to the take-out member.

The friction transmission mechanism 10 mainly includes an input shaft 12, an input raceway ring 14, an input shaft bearing 18, a friction rolling element 20, a first support raceway ring 26, a second support raceway ring 28, and a take-out member 30. Hereinafter, a direction along a center axis La of the input shaft 12 is referred to as an "axial direction", and a circumferential direction and a radial direction of a circle centered on the center axis La are referred to as a "circumferential direction" and a "radial direction", respectively. Additionally, hereinafter, for convenience, one side in the axial direction (right side in the figure) is referred to as an input side, and the other side (left side in the figure) is referred to as a counter-input side.

When the rotation of the motor 50 is input, the input shaft 12 rotates around the center axis La. The input shaft 12 of the present embodiment is a cylindrical member that extends in the axial direction. The input raceway ring 14 is fixed to an outer periphery of the input shaft 12, and the input raceway ring and input shaft rotate integrally. A counter-input side of the input shaft 12 is connected to an inner ring of the input shaft bearing 18. An outer ring of the input shaft bearing 18 supports the first support raceway ring 26. The input shaft 12 is surrounded by the first support raceway ring 26 via a clearance. The input shaft 12 and the first support raceway ring 26 are disposed as to be relatively rotatable.

An end portion of the input shaft 12 on the input side is connected to the relative position change mechanism 60, which will be described below. The input shaft 12 is moved in the axial direction by driving the relative position change mechanism 60. An outer peripheral portion of the input shaft 12 on the input side is surrounded by a rotor 52 of the motor 50. The input shaft 12 is supported by the rotor 52 so as to be movable in the axial direction. A spline groove 12s provided on an outer peripheral surface of the input shaft 12 and a spline groove 51s provided on an inner peripheral surface of the rotor 52 mesh with each other through a clearance.

In the present embodiment, the friction rolling element 20 functions as a planetary rolling element that transmits rotation while performing a planetary motion between the input raceway ring 14 and the take-out member 30. The input raceway ring 14 rotates around the center axis La as a rotation axis integrally with the input shaft 12. The input raceway ring 14 comes into contact with the friction rolling element 20 and causes the friction rolling element 20 to rotate and revolve as the input raceway ring 14 rotates. The input raceway ring 14 may be formed separately from the input shaft 12, but in this example, the input raceway ring 14 is formed integrally with the input shaft 12. The input raceway ring 14 is a substantially disc-shaped member and has a rolling contact surface 14h on the counter-input side. The rolling contact surface 14h is a surface on which the friction rolling element 20 rolls, and substantially comes into point contact with the friction rolling element 20. The rolling contact surface 14h is inclined with respect to the axial direction and the radial direction. The rolling contact surface 14h includes a tapered surface of which the diameter is reduced toward the counter-input side. The rolling contact surface 14h may be a curved surface such as a protruding surface or a recessed surface, but in this example, the rolling contact surface 14h is a flat surface.

The input shaft bearing 18 is provided between an end portion of the input shaft 12 on the counter-input side and the first support raceway ring 26. Although the type of bearing is not limited, the input shaft bearing 18 of the present embodiment is a rolling bearing having a spherical rolling element. The input shaft bearing 18 has an inner ring attached to the input shaft 12 and an outer ring fixed to the first support raceway ring 26.

The first support raceway ring 26 and the second support raceway ring 28 hold the posture and position of the friction rolling element 20 within a certain range. The first support raceway ring 26 and the second support raceway ring 28 are separated from each other with the friction rolling element 20 interposed therebetween and are disposed to face each other. The first support raceway ring 26 is disposed on a radially inner side on the counter-input side of the second support raceway ring 28.

The first support raceway ring 26 has a ring shape that surrounds the input shaft 12 via a clearance. The first support raceway ring 26 has a rolling contact surface 26h on the input side. The rolling contact surface 26h is a surface on which the friction rolling element 20 rolls, and substantially comes into point contact with the friction rolling element 20. The rolling contact surface 26h is inclined with respect to the axial direction and the radial direction. The rolling contact surface 26h includes a tapered surface of which the diameter is reduced toward the input side. The rolling contact surface 26h may be a curved surface such as a protruding surface or a recessed surface, but in this example, the rolling contact surface 26h is a flat surface. The first support raceway ring 26 is freely rotatable with respect to the input shaft 12 and the friction rolling element 20 and may be referred to as an idle raceway ring.

The second support raceway ring 28 has a ring shape that surrounds the input shaft 12 and the friction rolling element 20. The second support raceway ring 28 has a rolling contact surface 28h on the counter-input side. The rolling contact surface 28h is a surface on which the friction rolling element 20 rolls, and substantially comes into point contact with the friction rolling element 20. The rolling contact surface 28h is inclined with respect to the axial direction and the radial direction. The rolling contact surface 28h includes a tapered surface of which the diameter is reduced toward the input side. The rolling contact surface 28h may be a curved surface such as a protruding surface or a recessed surface, but in this example, the rolling contact surface 28h is a flat surface. The rolling contact surface 28h of the second support raceway ring 28 substantially faces the rolling contact surface 26h of the first support raceway ring 26 with the friction rolling element 20 interposed therebetween.

The second support raceway ring 28 is fixed to an inner peripheral side of the second casing 42, which will be described below. The second support raceway ring 28 may be formed separately from the second casing 42, but in this example, the second support raceway ring 28 is formed integrally with the second casing 42.

The take-out member 30 comes into contact with the friction rolling element 20 and rotates around the center axis as the friction rolling element 20 rotates. In this example, since the rotation axis of the take-out member 30 coincides with the center axis La, the take-out member 30 rotates around the center axis La. The take-out member 30 is connected to the output member 78 via the coupling 70, and the coupling 70 and the output member 78 rotate as the take-out member 30 rotates.

The take-out member 30 has a ring shape that surrounds the input shaft 12 and the friction rolling element 20. The take-out member 30 has a rolling contact surface 30h on the input side and functions as an output raceway ring at this point. The rolling contact surface 30h is a surface on which the friction rolling element 20 rolls, and substantially comes into point contact with the friction rolling element 20. The rolling contact surface 30h is inclined with respect to the axial direction and the radial direction. The rolling contact surface 30h includes a tapered surface of which the diameter is reduced toward the counter-input side. The rolling contact surface 30h may be a curved surface such as a protruding surface or a recessed surface, but in this example, the rolling contact surface 30h is a flat surface. The rolling contact surface 30h of the take-out member 30 substantially faces the rolling contact surface 14h of the input raceway ring 14 with the friction rolling element 20 interposed therebetween.

A plurality (for example, 6) of the friction rolling elements 20 are disposed at predetermined intervals in the circumferential direction. A retainer may be provided to hold the plurality of friction rolling elements 20 at desired positions, but in the present embodiment, the retainer is not provided. A configuration with no retainer is advantageous in terms of manufacturing cost, device size, device mass, and the like. In addition, the number of friction rolling elements 20 is not particularly limited and may be less than or more than 6, but 6 to 12 planetary rolling elements are preferable.

Hereinafter, when the rolling contact surface 30h of the take-out member 30, the rolling contact surface 14h of the input raceway ring 14, the rolling contact surface 26h of the first support raceway ring 26, and the rolling contact surface 28h of the second support raceway ring 28 are collectively referred to, these may be referred to simply as a "rolling contact surface".

The friction rolling element 20 is restricted in axial position, radial position, and posture by coming into contact with the four rolling contact surface. The shape of the friction rolling element 20 may be any shape as long as the posture of the friction rolling element 20 is determined by coming into contact with the four rolling contact surfaces and the friction rolling element 20 is rollable while coming into contact with the four rolling contact surfaces. The friction rolling element 20 of the present embodiment is a rotating body (hereinafter referred to as "prolate spheroid") obtained by rotating an ellipse or an oval around a minor axis. Additionally, in the present specification, a circle formed by passing through the center of the minor axis of the friction rolling element 20 and intersecting a plane perpendicular to a rotation axis Lb and the outer peripheral surface of the friction rolling element 20 is referred to as an "equator". In this example, the equator is a great circle formed by the intersection of a plane perpendicular to the rotation axis Lb and the outer peripheral surface of the friction rolling element 20.

The inclination of the rotation axis Lb of the friction rolling element 20 with respect to the center axis La changes depending on the relative positions of the four rolling contact surfaces. That is, the rotation axis Lb may be parallel to the center axis La or may be inclined with respect to the center axis La.

A ratio Ra (=axial dimension/radial dimension) of the axial dimension of the friction rolling element 20 to the radial dimension thereof will be described in a state where the rotation axis Lb of the friction rolling element 20 is parallel to the center axis La. When the ratio Ra is large, there is a possibility that a phenomenon occurs in which the friction rolling element 20 rotates around a pseudo-rotation axis perpendicular to the original rotation axis Lb. From the viewpoint of suppressing this phenomenon, the ratio Ra is preferably 1 or less, more preferably 0.8 or less, and still more preferably 0.6 or less. The ratio Ra may be 0.1 or more.

Output-side Mechanism

Figure 3:
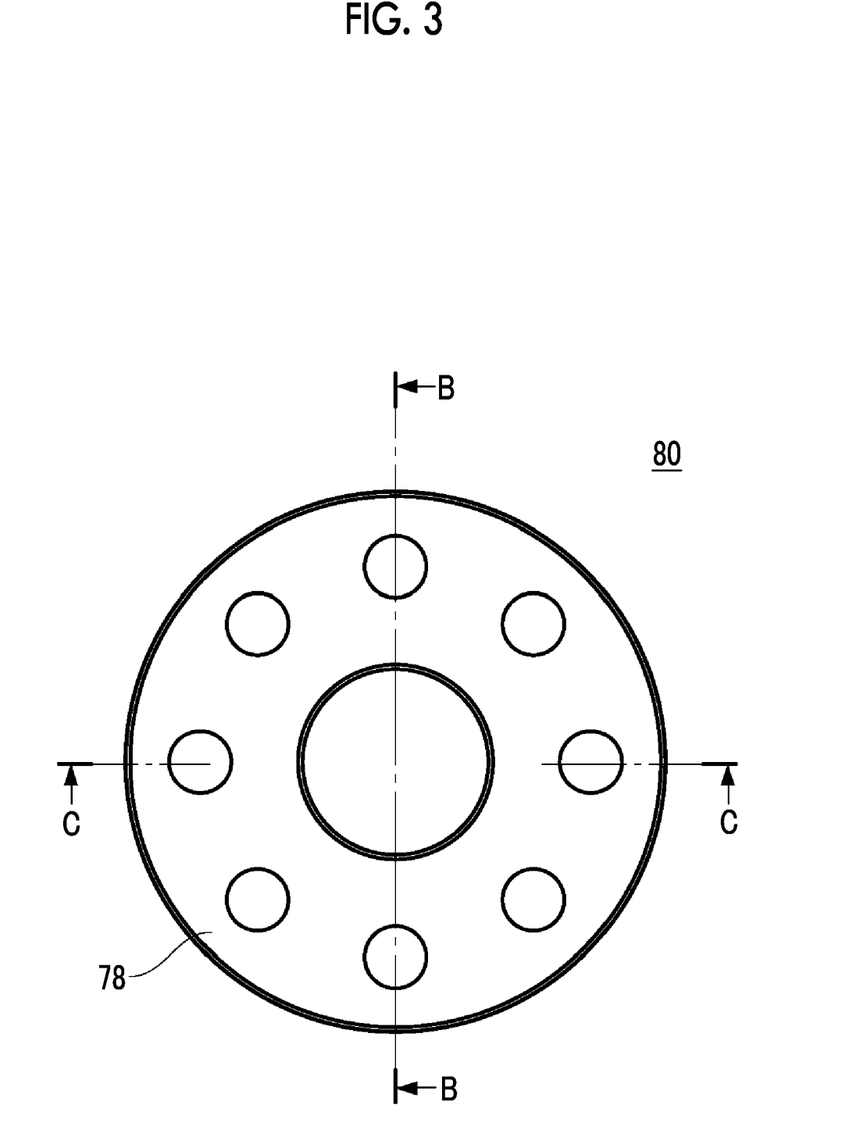
FIG. 3 is a front view schematically showing an output-side mechanism of FIG. 1.
Figure 4:
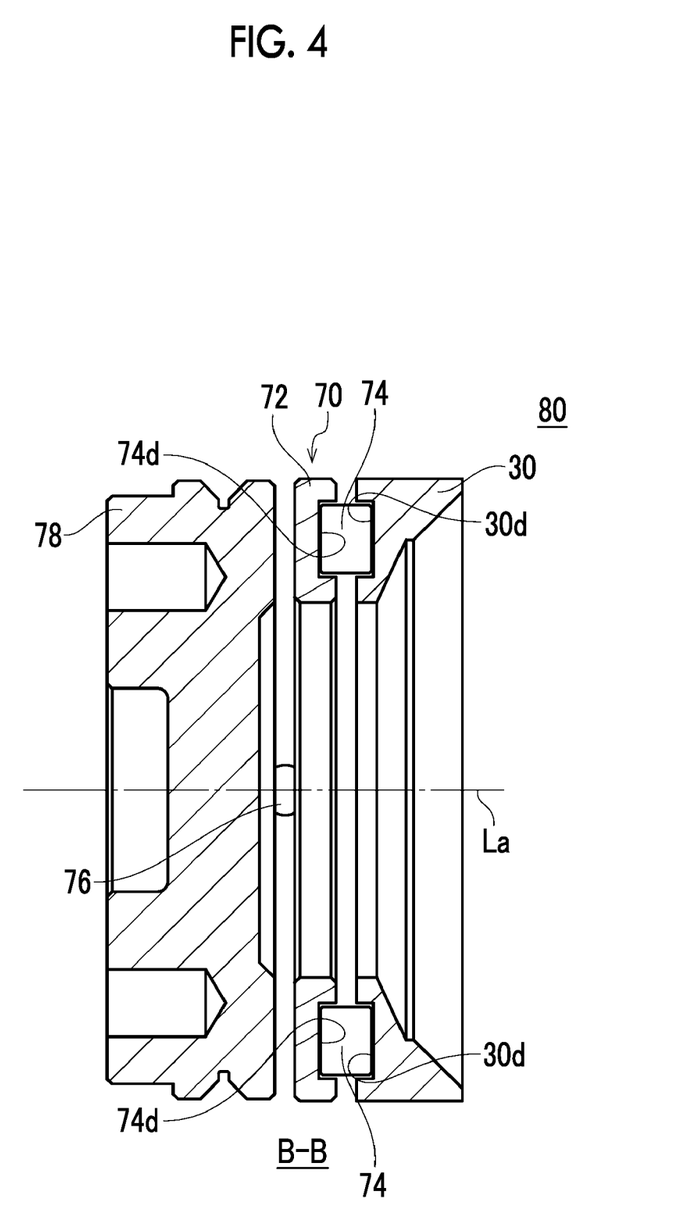
FIG. 4 is a sectional view showing a section of the output-side mechanism of FIG. 3 along line B-B.
Figure 5:
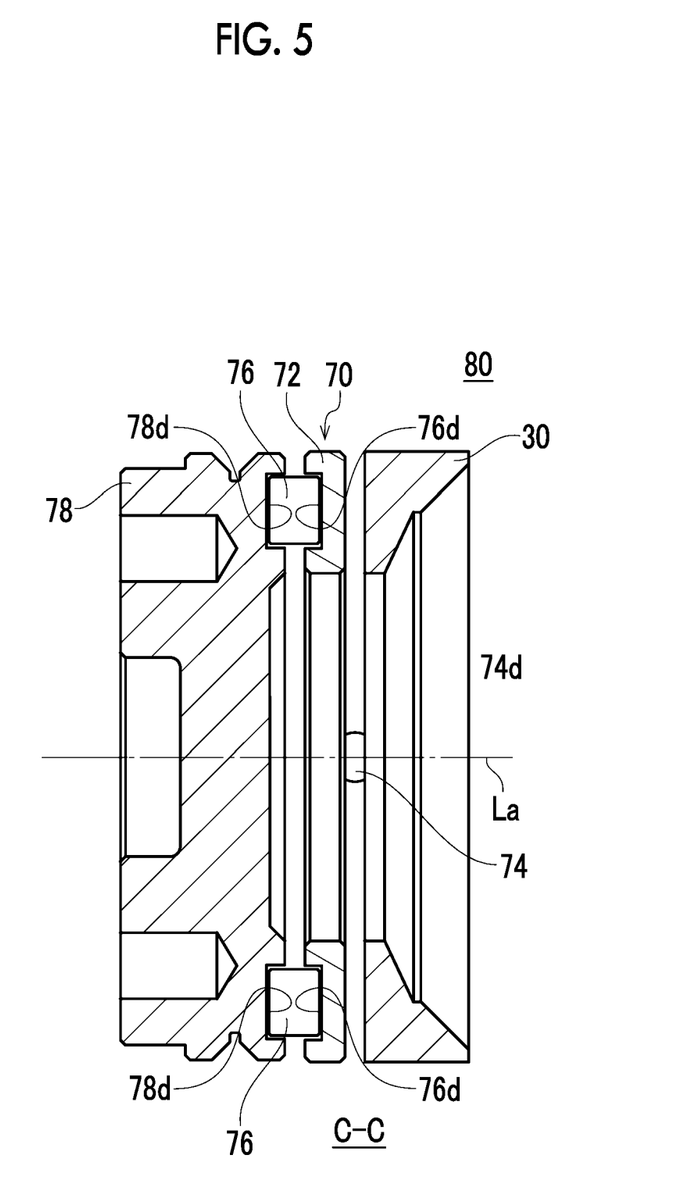
FIG. 5 is a sectional view showing a section of the output-side mechanism of FIG. 3 along line C-C.

The output-side mechanism 80 will be described with reference to FIGS. 3 to 5. FIG. 3 is a front view schematically showing the output-side mechanism 80. FIG. 4 is a sectional view showing a section of the output-side mechanism 80 along line B-B of FIG. 3. FIG. 5 is a sectional view showing a section of the output-side mechanism 80 along line C-C of FIG. 3. The output-side mechanism 80 has an output member 78 for transmitting the output rotation to the driven device, and a coupling 70 that connects the take-out member 30 and the output member 78 to each other.

The output member 78 will be described. The output member 78 is connected to the take-out member 30 via the coupling 70 and rotates as the take-out member 30 rotates. The output member 78 may be referred to as an output flange. The output member 78 of this example has a substantial disc shape and is rotatably supported by the first casing 40 via a main bearing 34 described below. The driven device is connected to the counter-input side of the output member 78.

The coupling 70 will be described. The coupling of the present embodiment has a configuration in which the take-out member 30 is movable in a first direction perpendicular to the axial direction, and the output member 78 is movable in a direction perpendicular to the axial direction and different from the first direction.

The coupling 70 of the present embodiment has a coupling body 72, a first coupling recessed portion 74d and a second coupling recessed portion 76d, a first fitting member 74, and a second fitting member 76. In this example, the coupling body 72 is a disc-shaped member. The first coupling recessed portion 74d is provided on the input side of the coupling body 72, and the second coupling recessed portion 76d is provided on the counter-input side of the coupling body 72. The first fitting member 74 fits into the first coupling recessed portion 74d and a take-out member recessed portion 30d provided on the counter-input side of the take-out member 30 with play in the first direction. The second fitting member 76 fits into the second coupling recessed portion 76d and an output member recessed portion 78d provided on the input side of the output member 78 with play in the second direction.

Hereinafter, when the first fitting member 74 and the second fitting member 76 are collectively referred to, these are simply referred to as a "fitting member". Additionally, the first coupling recessed portion 74d, the second coupling recessed portion 76d, the take-out member recessed portion 30d, and the output member recessed portion 78d are collectively referred to as a "fitting recessed portion".

The easy deformability of the coupling 70 will be described. The coupling body 72 is configured to easily bend in the axial direction, so that misalignment in the axial direction can be absorbed. As an example, the coupling body 72 may be made of a material having a Young's modulus lower than that of the take-out member 30 and the output member 78 so as to easily bend. For example, in a case where the take-out member 30 and the output member 78 are made of an iron-based metal, the coupling body 72 may be made of a metal such as aluminum or a resin material having a Young's modulus lower than that of the iron-based metal. In the present embodiment, the coupling body 72 is formed to have a smaller axial dimension than the take-out member 30 and the output member 78 so as to easily bend. For the comparison of the axial dimensions of the respective members, for example, the maximum values of the axial dimensions or the minimum values of the axial dimensions may be compared with each other, or both may be compared with each other. Additionally, the average values or the intermediate values of the axial dimensions may be compared with each other. The axial dimension of the coupling body 72 can be set by simulation or experiment according to desired easy deformability.

Additionally, since the coupling body 72 is configured to be easily bent in the axial direction, the coupling body 72 functions as a spring that bend in the axial direction. By using the coupling body 72 as a spring, the pressurization load acting on the take-out member 30 can be adjusted. In this case, a change in pressurization resulting from the thermal expansion of each member can be alleviated.

The axial center deviation absorption function of the present embodiment will be described. A plurality of the first fitting members 74 are provided at predetermined intervals at positions offset from the center axis La. In the present embodiment, the two first fitting members 74 are separated from each other in the first direction perpendicular to the axial direction and are disposed symmetrically to each other with the center axis La interposed therebetween. The two first fitting members 74 are rollers having a cylindrical surface having a center in the first direction.

A plurality of the second fitting members 76 are provided at predetermined intervals at positions offset from the center axis La. In the present embodiment, the two second fitting members 76 are separated from each other in the second direction perpendicular to the axial direction and are disposed symmetrically to each other with the center axis La interposed therebetween. The two second fitting members 76 are rollers having a cylindrical surface having a center in the second direction. The first direction and the second direction intersect each other when viewed from the axial direction and are perpendicular to each other in this example.

The first fitting member 74 fits into the first coupling recessed portion 74d and a take-out member recessed portion 30d with play in the first direction. As an example, in a first direction dimension, the first fitting member 74 is configured to be smaller than the first coupling recessed portion 74d and the take-out member recessed portion 30d by the amount of play.

The second fitting member 76 fits into the second coupling recessed portion 76d and an output member recessed portion 78d with play in the second direction. As an example, in a second direction dimension, the second fitting member 76 is configured to be smaller than the second coupling recessed portion 76d and the output member recessed portion 78d by the amount of play.

Figure 6A:
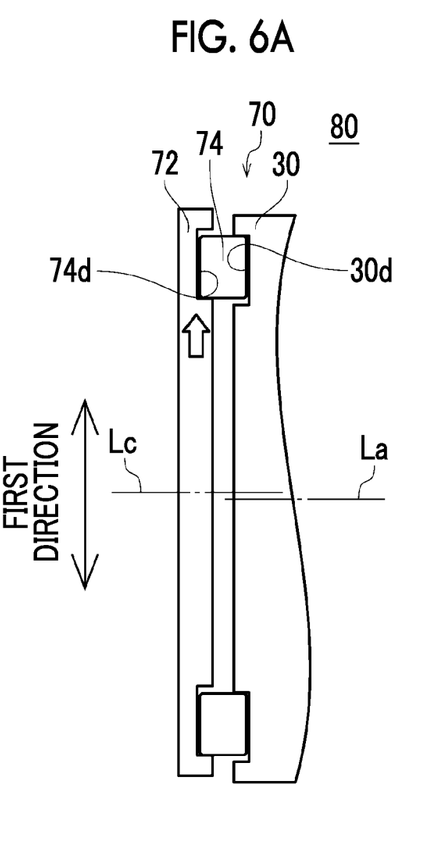
FIGS. 6A and 6B are explanatory diagrams showing an axial center deviation absorption operation of the output-side mechanism of FIG. 1.
Figure 6B:
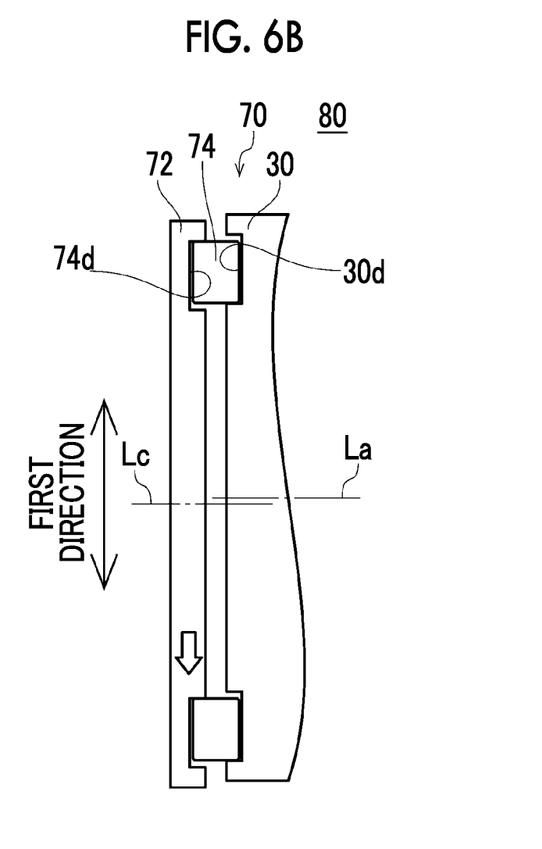
Figure 7A:
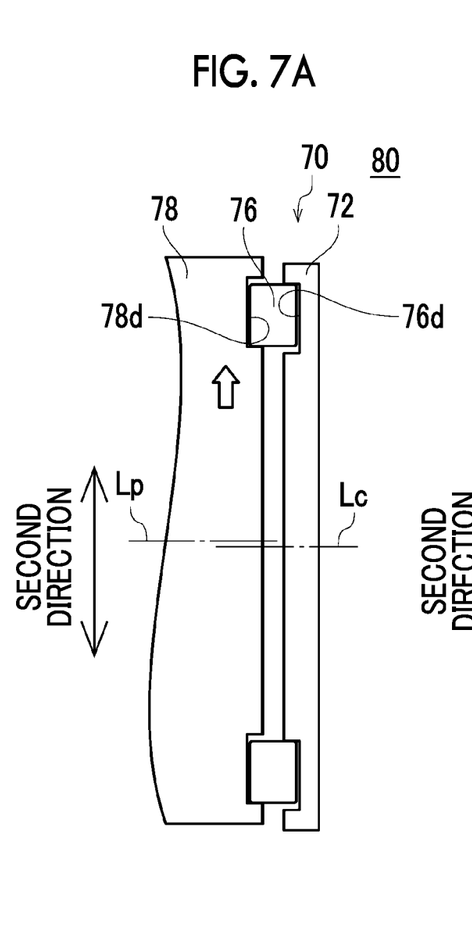
FIGS. 7A and 7B are explanatory diagrams showing the axial center deviation absorption operation of the output-side mechanism of FIG. 1.
Figure 7B:
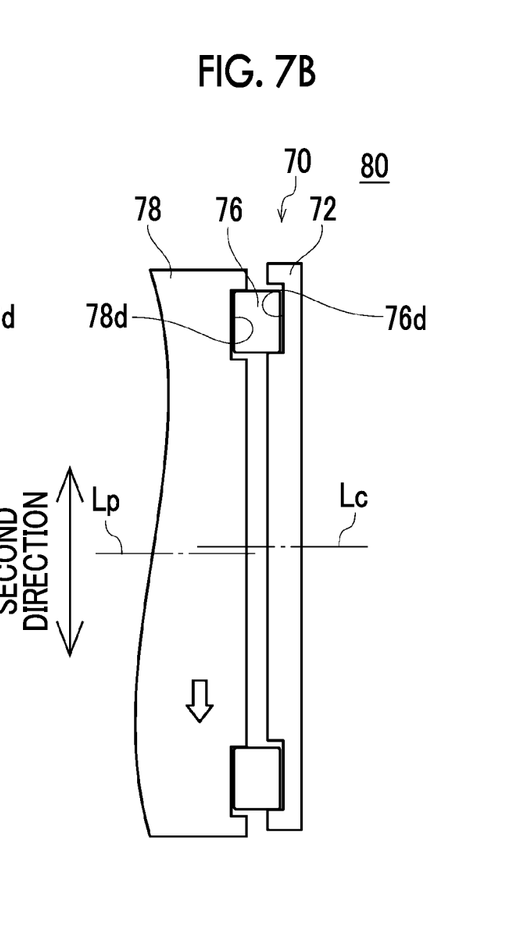

The axial center deviation absorption operation of the output-side mechanism 80 will be described with reference to FIGS. 6A and 6B and FIGS. 7A and 7B. FIGS. 6A and 6B and FIGS. 7A and 7B are explanatory diagrams illustrating the operation of the output-side mechanism 80. FIGS. 6A and 6B show the axial center deviation absorption operation of the output-side mechanism 80 in the first direction, and FIGS. 7A and 7B show the axial center deviation absorption operation of the output-side mechanism 80 in the second direction. FIG. 6A shows a state in which a center Lc of the coupling body 72 has deviated in the direction of a white arrow in the first direction with respect to the center axis La of the take-out member 30. FIG. 6B shows a state in which the center Lc of the coupling body 72 has deviated in the direction of an white arrow in the first direction with respect to the center axis La. In this way, by having the play in the first direction between the first fitting member 74, and the first coupling recessed portion 74d and the take-out member recessed portion 30d, the axial center deviation in the first direction therebetween can be absorbed.

FIG. 7A shows a state in which a center Lp of the output member 78 has deviated in the direction of a white arrow in the second direction from the center Lc of the coupling body 72. FIG. 7B shows a state in which a center Lp of the output member 78 has deviated in the direction of a white arrow in the second direction from the center Lc. In this way, by having the play in the second direction between the second fitting member 76, and the second coupling recessed portion 76d and the output member recessed portion 78d, the axial center deviation in the second direction can be absorbed therebetween. Since the axial center deviation can be absorbed in the first direction and the second direction that intersect each other, the coupling 70 can absorb the axial center deviation between the output member 78 and the take-out member 30. The amount of play in the first direction and the amount of play in the second direction can be set by simulation or experiment according to a desired axial center deviation absorption amount.

Figure 8:
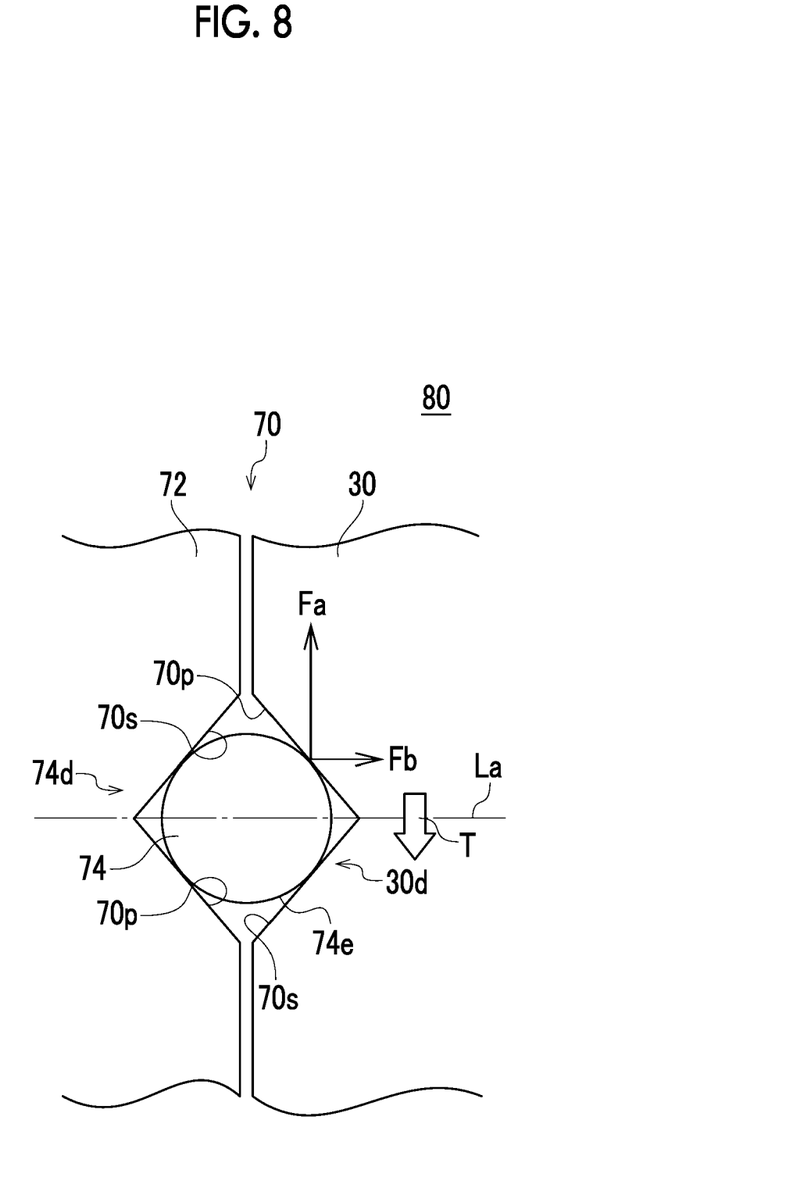
FIG. 8 is a schematic diagram schematically showing a fitting recessed portion and a fitting member of the output-side mechanism of FIG. 1.

The torque pressurization conversion function of the output-side mechanism 80 will be described with reference to FIG. 8. FIG. 8 is an explanatory diagram schematically showing the fitting recessed portion and the fitting member when viewed from the radial direction. In this description, the first coupling recessed portion 74d and the take-out member recessed portion 30d are shown as an example of the fitting recessed portion, and the first fitting member 74 is shown as an example of the fitting member, but this description can be similarly applied to the fitting recessed portion and the fitting member.

As shown in FIG. 8, the circumferential centers of the first coupling recessed portion 74d and the take-out member recessed portion 30d recede most and have a V-shaped groove shape when viewed from the radial direction. That is, the fitting recessed portions have a first inclined surface 70p and a second inclined surface 70s that are in contact with each other at the circumferential centers. The first inclined surface 70p and the second inclined surface 70s are surfaces that are inclined with respect to a plane perpendicular to the axial direction. The cylindrical surface 74e of the first fitting member 74 comes into contact with the first inclined surface 70p and the second inclined surface 70s. When the first inclined surface 70p and the second inclined surface 70s are collectively referred to, these may be simply referred to as an inclined surface.

For example, when a transmission torque T acts on the take-out member 30 and the first inclined surface 70p comes into contact with the cylindrical surface 74e, the first inclined surface 70p applies a rotational force based on the transmission torque T to the cylindrical surface 74e. In this case, the cylindrical surface 74e applies a force Fa in a counter-rotation direction as a reaction force to the first inclined surface 70p. An axial component force Fb is generated on the first inclined surface 70p on the basis of the force Fa in the counter-rotation direction. The axial component force Fb is a force that pushes the take-out member 30 toward the friction rolling element 20 and increases these pressurization loads.

Additionally, also between the first fitting member 74 and the first coupling recessed portion 74d, similarly, a force in a direction in which the pressurization load is increased acts on the first fitting member 74 by a reaction force based on the transmission torque T. Since the axial component force Fb is considered to be proportional to the transmission torque T, the axial component force Fb increases as the transmission torque T increases and decreases as the transmission torque T decreases. For this reason, the pressurization load is appropriately adjusted according to the transmission torque T. The inclination angles of the first inclined surface 70p and the second inclined surface 70s with respect to the plane perpendicular to the axial direction can be set by simulation or experiment according to desired torque pressurization conversion characteristics.

In addition, an external torque acting on the output member 78 from the outside applies a force in the counter-rotation direction from the output member 78 via the second fitting member 76, the coupling body 72, and the first fitting member 74 to the first inclined surface 70p. Since this force is superimposed on the force Fa in the counter-rotation direction and the component force Fb, the force for pushing the take-out member 30 toward the friction rolling element 20 is increased. That is, even in a case where the external torque is applied, the pressurization load increases correspondingly.

In the above-described example, an example is shown the coupling body 72 is provided with the first coupling recessed portion 74d and the second coupling recessed portion 76d, but it is not essential to provide these recessed portions. For example, one or both of the first fitting member 74 and the second fitting member 76 may be provided integrally with the coupling body 72. Also in this case, the axial center deviation absorption function and the torque pressurization conversion function can be realized while ensuring the easy deformability of the coupling 70.

Next, other configurations of the friction transmission device 100 will be described with reference to FIG. 2. The friction transmission device 100 further includes a main bearing 34, an oil seal 36, and first and second casings 40 and 42.

Main Bearing

As shown in FIG. 2, the main bearing 34 is provided between the output member 78 and the first casing 40 and rotatably supports the output member 78 with respect to the first casing 40. Although the type of bearing is not limited, the main bearing 34 of the present embodiment is a cross roller bearing having a cylindrical roller as a rolling element. An inner ring of the main bearing 34 is provided integrally with the output member 78, and an outer ring of the main bearing 34 is provided integrally with the first casing 40.

Oil Seal

As shown in FIG. 2, the oil seal 36 is provided between the output member 78 and the first casing 40 on the counter-input side of the main bearing 34. The oil seal 36 suppresses leakage of a lubricating material from the main bearing 34 and reduces entering of foreign matter into the main bearing 34.

Casing

As shown in FIG. 2, the first and second casings 40 and 42 are hollow substantially cylindrical members and function as an outer shell of the friction transmission device 100. The first and second casings 40 and 42 include the first casing 40 that surrounds mainly the output member 78, and the second casing 42 that is connected to the input side of the first casing 40 and surrounds mainly the coupling 70 and the friction transmission mechanism 10. The first casing 40 is connected to the second casing 42 by a bolt B2. A second support raceway ring 28 is provided on an inner peripheral side of the second casing 42. A flange portion 42f is provided on an outer peripheral side of the second casing 42. The second casing 42 is connected to the motor 50 by connecting the flange portion 42f to a motor casing 54, which will be described below, with bolt B1.

Motor

Next, the motor 50 will be described with reference to FIG. 2. The type of the motor 50 is not limited, but the motor 50 of the present embodiment is an inner rotor type brushless motor having a motor shaft 51. The motor 50 mainly includes the motor shaft 51, the rotor 52, a stator 53, a motor casing 54, a first cover portion 56, a second cover portion 57, and a pair of motor bearings 58. The motor shaft 51 is a hollow shaft having a hollow portion 51c for advancing and retreating a linear motion shaft 66, which will be described below. The motor shaft 51 is supported on the first cover portion 56 and the second cover portion 57 by a pair of motor bearings 58 disposed apart from each other in the axial direction. The rotor 52 has a main body portion 52b integrally formed at an outer periphery of the motor shaft 51, and a cylindrical magnet 52m fixed to an outer periphery of the main body portion 52b and having a predetermined magnetic pole.

The stator 53 has a stator core 53s that faces a magnet 52m via a magnetic clearance, and an armature coil 53c provided on the stator core 53s. The motor casing 54 is a cylindrical member fixed to an outer periphery of the stator core 53s. The first cover portion 56 is a disc-shaped member that blocks the counter-input side of the motor casing 54. The second cover portion 57 is a disc-shaped member that blocks the input side of the motor casing 54. The first cover portion 56, the motor casing 54, and the second cover portion 57 are integrated by the bolt B1 and connected to the flange portion Relative Position Change Mechanism Next, the relative position change mechanism 60 will be described with reference to FIG. 2. The friction transmission device 100 of the present embodiment further includes a relative position change mechanism 60. The relative position change mechanism 60 is a mechanism that changes the relative positions of the input raceway ring 14, the take-out member 30, the first support raceway ring 26, and the second support raceway ring 28. The relative position change mechanism 60 may change the relative position between one or more of these four raceway rings and the remaining raceway ring. The relative position change mechanism 60 of the present embodiment has a moving mechanism 62 that integrally and relatively moves the input raceway ring 14 and the first support raceway ring 26 in the axial direction.

The moving mechanism 62 is a linear motion actuator having a linear motion shaft 66 that advances and retreats in the hollow portion 51c of the motor shaft 51, and an actuator main body 64 that generates an axial driving force on the linear motion shaft 66. The linear motion shaft 66 has a circular rod shape that extends in the axial direction. A part of the actuator main body 64 is housed in the hollow portion 51c of the motor shaft 51. The configuration of the moving mechanism 62 is not limited as long as the moving mechanism 62 can be driven to advance and retreat the linear motion shaft 66. For example, the linear motion shaft 66 may be driven by a stepping motor, or may be driven in the axial direction without rotation by a voice coil motor or the like. The moving mechanism 62 of the present embodiment converts a rotary motion into a linear motion by a ball screw mechanism, and drives the linear motion shaft 66 in the axial direction.

The actuator main body 64 is provided with an extension portion 62f that extends outward in the radial direction. The actuator main body 64 is connected to the motor 50 by fixing the extension portion 62f to the second cover portion 57 with a bolt B3.

A connecting hole 12h recessed on the counter-input side is provided at the end portion of the input shaft 12 on the input side. A tip of the linear motion shaft 66 is accommodated in the connecting hole 12h. A connecting bearing 68 is provided between the linear motion shaft 66 and the connecting hole 12h. An outer ring of the connecting bearing 68 is fixed to the connecting hole 12h, and an inner ring of the connecting bearing 68 is fixed to the tip of the linear motion shaft 66. With this configuration, the input shaft 12 and the linear motion shaft 66 are rotatably connected to each other. In addition, in a case where the linear motion shaft 66 moves without rotation, the linear motion shaft 66 and the input shaft 12 may be connected to each other without via the connecting bearing 68.

When the linear motion shaft 66 moves in the axial direction, the input shaft 12 also moves in the axial direction, and accordingly, the input raceway ring 14 and the first support raceway ring 26 move to the input side or the counter-input side, and relative relationships between these rings and the take-out member 30 and the second support raceway ring 28 are changed. By changing the relative relationships, a change gear ratio Rs of the friction transmission mechanism 10 is changed. In this way, in the present embodiment, the change gear ratio Rs can be changed by a simple configuration in which the input shaft 12 is moved in the axial direction. Additionally, since the linear motion shaft 66 is disposed in the hollow portion 51c of the motor shaft 51, the size of the device can be reduced.

Figure 9:
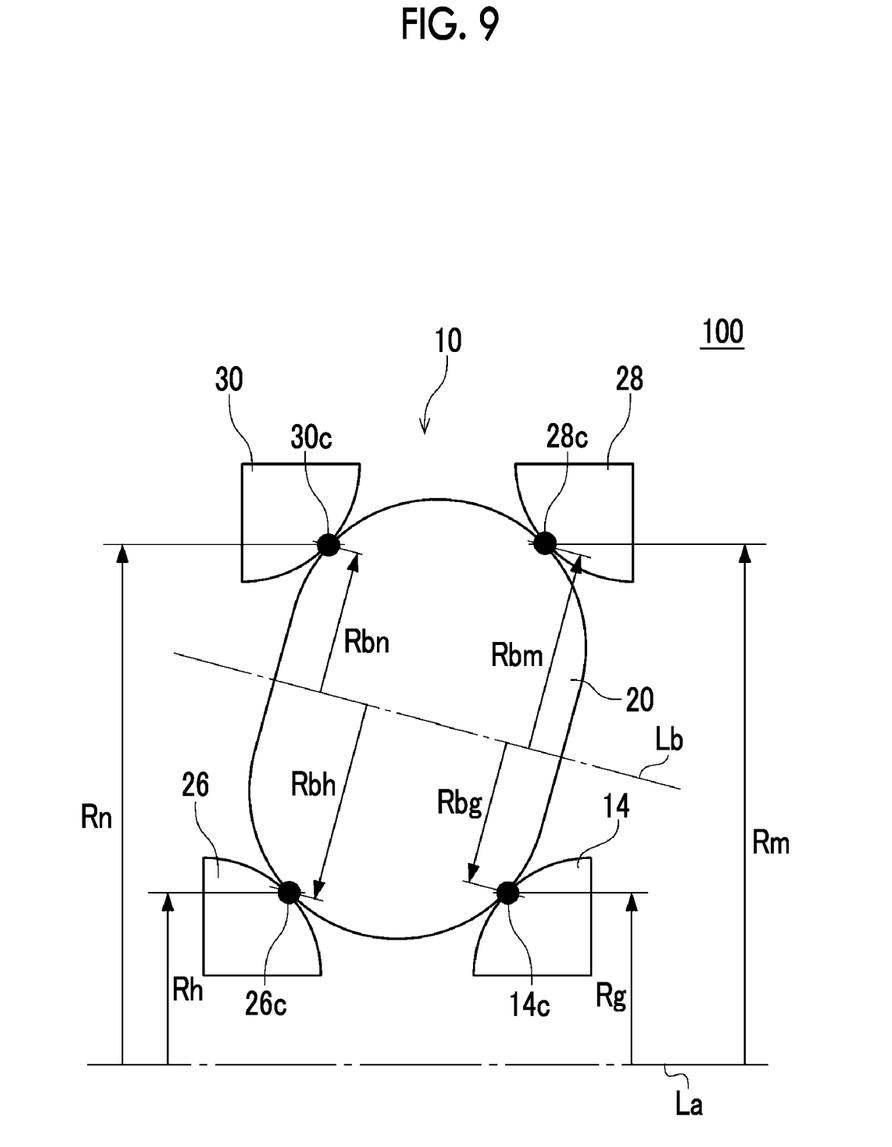
FIG. 9 is an explanatory diagram illustrating the operation of a friction transmission mechanism of FIG. 1.

The operation of the friction transmission mechanism 10 will be described with reference to FIG. 9. FIG. 9 is an explanatory diagram illustrating the operation of the friction transmission mechanism 10. In this figure, each rolling contact surface is drawn in a curved surface shape, but each rolling contact surface is flat in a contact region with the friction rolling element 20. When the input raceway ring 14 rotates, the friction rolling element 20 revolves around a revolution axis while rotating around the rotation axis Lb. In this example, since the revolution axis of the friction rolling element 20 coincides with the center axis La, the center axis La will be described below as the revolution axis.

The contact points between the friction rolling element 20 and the input raceway ring 14, the first support raceway ring 26, the second support raceway ring 28, and the take-out member 30 are referred to as an input contact point 14c, a first support contact point 26c, a second support contact point 28c, and an output contact point 30c. As shown in FIG. 9, the rotation radii of the contact points 14c, 26c, 28c, and 30c are referred to as Rbg, Rbh, Rbm, Rbn, and the revolution radii of the contact points 14c, 26c, 28c, and 30c are Rg, Rh, Rm, and Rn.

In a case where the first support raceway ring 26 freely rotates and the second support raceway ring 28 is stationary without rotation, the ratio (hereinafter, referred to as the "change gear ratio Rs") of a rotation speed ω2 of the take-out member 30 to a rotation speed ωl of the input raceway ring 14 is represented by the following numerical expression 1.

Expression 1

Change gear ratio Rs=Output rotation speed ω2/Input rotation speed ω1=(Rbm/Rm−Rbn/Rn)/(Rbn/Rn+Rbm/Rm)

In the state of FIG. 9, the friction rolling element 20 has a posture in which the input side of the rotation axis Lb approaches the center axis La. When the positions of the input raceway ring 14 and the first support raceway ring 26 are changed to the input side by the relative position change mechanism 60, the posture of the friction rolling element 20 is changed such that the counter-input side of the rotation axis Lb approaches the center axis La. As a result, the rotation radius and the revolution radius of each contact point are changed, and the change gear ratio Rs is also changed. In this way, the change gear ratio Rs of the friction transmission mechanism 10 can be changed by changing the relative positions of the respective raceway rings to changing the posture of the friction rolling element 20. Conversely, by constantly supporting the posture of the friction rolling element 20, the change gear ratio Rs is kept constant.

In order to suppress fluctuations in the posture of the friction rolling element 20, as an example, a configuration may be provided in which a shaft member is provided on the friction rolling element 20 along the rotation axis Lb, and the shaft member is supported by a bearing. In this case, the friction rolling element 20 is supported by the shaft member. In the present embodiment, the friction rolling element 20 is supported by the input raceway ring 14, the take-out member 30, the first support raceway ring 26, and the second support raceway ring 28 without being supported by the shaft member.

Figure 10:
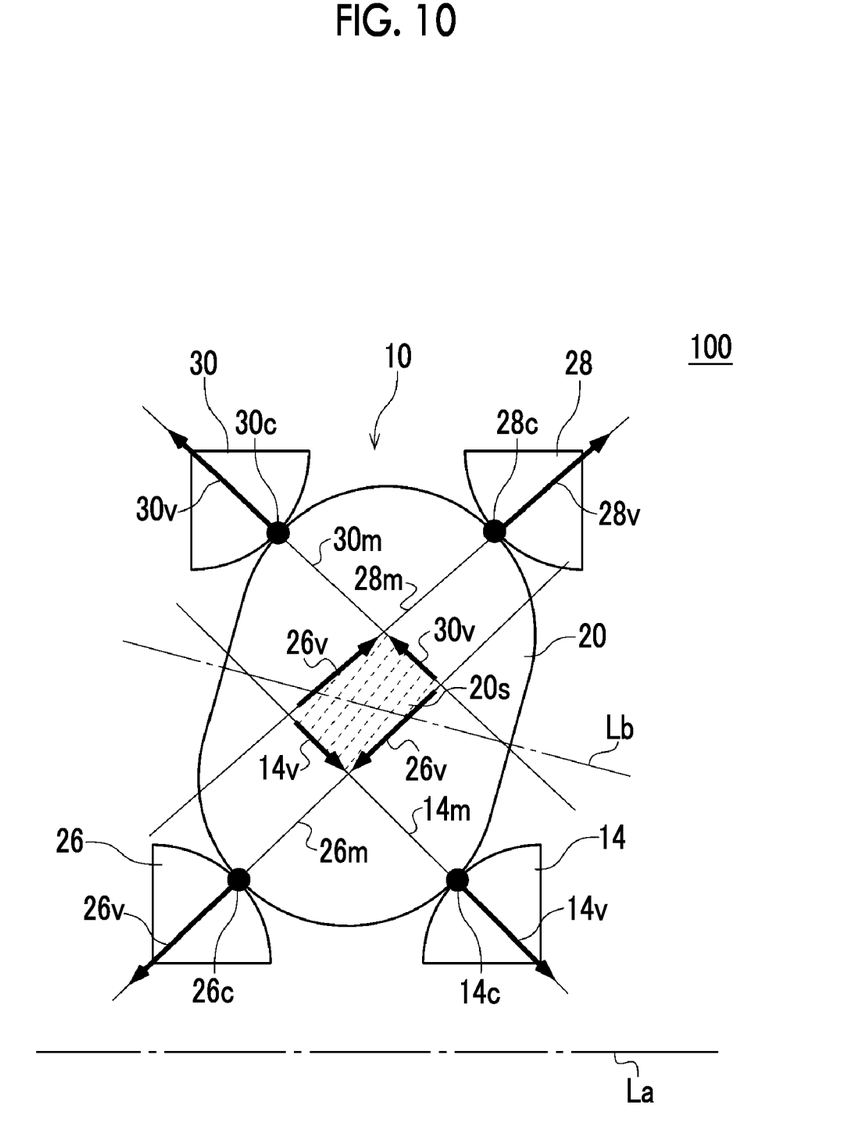
FIG. 10 is an explanatory diagram illustrating vectors at a contact point of a friction rolling element of FIG. 1.

A configuration in which the friction rolling element 20 is supported by the raceway rings will be described with reference to FIG. 10. FIG. 10 is an explanatory diagram illustrating a configuration in which the friction rolling element 20 is supported by the respective raceway rings. This figure shows extension lines of respective vectors in a plane including the center axis La and the rotation axis Lb. As shown in FIG. 10, in the present embodiment, a quadrangle is formed by extension lines of normal vectors at the contact points between the friction rolling element and the respective raceway rings. Depending on the shape of the friction rolling element 20, the quadrangle formed by the extension lines is not formed, and the posture of the friction rolling element 20 becomes unstable.

As shown in FIG. 10, regarding a normal vector 14v at the input contact point 14c, a normal vector 26v at the first support contact point 26c, a normal vector 28v at the second support contact point 28c, and a normal vector 30v at the output contact point 30c, the extension lines 14m, 26m, 28m, and 30m of the normal vectors intersect each other to form a quadrangle 20s. With this configuration, the posture of the friction rolling element 20 is uniquely determined, and the posture of the friction rolling element 20 is maintained without being supported by the shaft member. In addition, as long as the quadrangle 20s is a protruding quadrangle (a quadrangle having no angular portions of which the internal angle is 180 degrees or more), the stability of the posture is further improved.

The area of the quadrangle 20s may be too small depending on the shape of the friction rolling element 20. When the area of the quadrangle 20s is too small, there is a possibility that the posture of the friction rolling element 20 becomes unstable. From the viewpoint of stabilizing the posture, the area of the quadrangle 20s is preferably 4% or more, more preferably 25% or more, and still more preferably 60% or more of the cross-sectional area of the friction rolling element 20. The area of the quadrangle 20s may be 15% or more of the cross-sectional area of the friction rolling element 20.

The directions of the normal vectors of the opposite sides of the quadrangle 20s may be the same depending on the shape of the friction rolling element 20. In a case where the directions of the normal vectors of the opposite sides of the quadrangle 20s are the same, there is a possibility that the posture of the friction rolling element 20 becomes unstable. Thus, in the present embodiment, the normal vectors of the opposite sides of the quadrangle are configured to have opposite directions. Specifically, the normal vector 14v and the normal vector 30v are in opposite directions, and the normal vector 26v and the normal vector 28v are in opposite directions. In this case, since the position and direction of the friction rolling element 20 are constrained by the respective raceway rings, the posture of the friction rolling element 20 is further stabilized. Additionally, in a case where both of the normal vectors of two adjacent sides of the quadrangle 20s are directed in a direction toward the angular portions or away from the angular portions, the posture becomes more stable.

When the contact surfaces of each raceway ring and the friction rolling element 20 are both flat surfaces, the contact area increases and mechanical loss increases, and when the contact surfaces are both curved surfaces, the manufacturing effort increases. For this reason, in the present embodiment, with respect to the contact surfaces of the input contact point 14c, the first support contact point 26c, the second support contact point 28c, and the output contact point 30c, the respective raceway rings are flat surfaces, and the surfaces of the friction rolling element 20 facing the respective raceway rings are curved surfaces. In this case, the increase in mechanical loss can be suppressed, and the manufacturing of the member becomes easy. The curved surfaces of the friction rolling element 20 are not limited, but in this example, the curved surfaces have the contour of an involute curve.

The operation of the friction transmission device 100 configured as described above will be described. When rotational power is transmitted from the motor shaft 51 to the input shaft 12, the input raceway ring 14 rotates around the center axis La. The rotation of the input raceway ring 14 causes the friction rolling element 20 to rotate and revolve. The rotation of the friction rolling element 20 is transmitted to the take-out member 30, and the take-out member 30 rotates according to the above-described change gear ratio Rs. The rotation of the take-out member 30 is output to the output member 78 via the coupling 70. When the positions of the input raceway ring 14 and the first support raceway ring 26 are changed by the relative position change mechanism 60, the change gear ratio Rs is changed.

The features of the friction transmission device 100 will be described. The coupling 70 of the friction transmission device 100 is configured to be more easily deformed than the take-out member 30 and the output member 78 with respect to an axial load, and has a function of absorbing the deviation of the axial center between the take-out member 30 and the output member 78 and a function of converting the torque acting on the output member 78 into an axial force to transmit the axial force to the take-out member side. According to this configuration, since the axial center deviation between the take-out member and the output member is absorbed and the shortage of the transmission torque capacity is compensated, the degradation in efficiency and the decrease in life of the friction transmission device can be suppressed.

Additionally, in the friction transmission device 100, since the quadrangle is configured to be formed by the extension lines of the normal vectors at the contact points between the friction rolling element 20 and the respective raceway rings, the posture of the friction rolling element 20 is stable as compared to a case where the quadrangle is not formed by the extension lines. Since the configuration for maintaining the posture of the friction rolling element 20 is simple, the manufacturing cost can be reduced.

In the friction transmission device 100, the friction rolling element 20 is supported by the input raceway ring 14, the take-out member 30, the first support raceway ring 26, and the second support raceway ring 28 without being supported by the shaft member, the manufacturing cost of the shaft member and the peripheral members thereof can be reduced.

The examples of the embodiments of the present invention have been described in detail above. All of the aforementioned embodiments merely show specific examples for carrying out the present invention. The contents of the embodiments do not limit the technical scope of the present invention, and many design changes such as changes, additions, and deletions of components can be made without departing from the idea of the invention defined in the claims. In the aforementioned embodiments, the contents that can be changed in such designs are described with notations such as "of the embodiment" and "in the embodiment" but do not mean that design changes are not allowed for the contents without such notations. Additionally, the hatching given to the section of the drawing does not limit the material of a hatched object.

Modification examples will be described below. In the drawings and description of modification examples, the same or equivalent components and members as those of the embodiments will be designated by the same reference numerals. The description that overlaps that of the embodiments will be appropriately omitted, and the configuration different from that of the embodiment will be described intensively.

MODIFICATION EXAMPLE

In the description of the embodiment, an example has been shown in which the first coupling recessed portion 74d, the second coupling recessed portion 76d, the take-out member recessed portion 30d, and the output member recessed portion 78d have the first inclined surface 70p and the second inclined surface 70s, but the present invention is not limited to this. For example, the inclined surfaces may not be provided in some or all of these recessed portions.

In the description of the embodiment, an example has been shown in which the first fitting member 74 and the second fitting member 76 are rollers having a cylindrical surface, but the present invention is not limited thereto. These fitting members may be, for example, polyhedrons such as cubes and rectangular parallelepipeds, spheres, or the like, or members having different shapes may be used in combination.

In the description of the embodiment, an example has been shown in which the first fitting member 74 and the second fitting member 76 are movably supported by the fitting recessed portions, but the present invention is not limited thereto. For example, some or all of these fitting members may be fixed. For example, some or all of these fitting members may be integral with the output member, the coupling body, the take-out member, or other members.

In the description of the embodiment, an example has been shown in which the first coupling recessed portion 74d, the second coupling recessed portion 76d, the take-out member recessed portion 30d, and the output member recessed portion 78d generate the axial center deviation absorption function and the torque pressurization conversion function, but the present invention is not limited to this. Some of these fitting recessed portions may not generate the axial center deviation absorption function, and some of these fitting recessed portions may not generate the torque pressurization conversion function. One of the axial center deviation absorption function and the torque pressurization conversion function may be realized by a mechanism different from these fitting recessed portions.

In the description of the embodiments, an example having two support raceway rings 26 and 28 has been shown, but the present invention is not limited to this, and three or more support raceway rings may be provided.

In the description of the embodiments, an example has been shown in which the first support raceway ring 26 freely rotates and the second support raceway ring 28 is stationary, but the present invention is not limited thereto. The first support raceway ring 26 may be stationary and the second support raceway ring 28 may rotate freely.

In the description of the embodiments, with respect to the rotation axis of the friction rolling element 20, the input raceway ring 14 is disposed on the radially inner side and the take-out member 30 is disposed on the radially outer side. However, the present invention is not limited to this, and the input raceway ring 14 may be disposed on the outer side and the take-out member 30 may be disposed on the inner side, both may be disposed on the inner side, or both may be disposed on the outer side. The configuration of the friction transmission device is not limited to the configuration of the embodiment, and the present invention can be widely applied as long as one having the friction transmission mechanism that transmits power by the contact between the take-out member from which the output rotation is taken out and the plurality of friction rolling elements and having a configuration in which the contact surface of the take-out member is inclined with respect to the axial direction is provided.

The above-described respective modification example examples have the same actions and effects as those of the embodiments.

Any combination of the components of the above-described embodiments and any of the modification examples is also useful as embodiments of the present invention. New embodiments resulting from the combination also have the respective effects of the combined embodiments and the modification examples.

The present invention can be used for the friction transmission device.

It should be understood that the invention is not limited to the above-described embodiment, but may be modified into various forms on the basis of the spirit of the invention. Additionally, the modifications are included in the scope of the invention.

What is claimed is:

1. A friction transmission device which has a friction transmission mechanism that transmits power by contact between a take-out member from which output rotation is taken out and a plurality of friction rolling elements, the take-out member having a contact surface inclined with respect to an axial direction, the friction transmission device comprising:
   an output member that is used to transmit the output rotation to a driven device; and
   a coupling that connects the take-out member and the output member to each other,
   wherein the coupling is configured to be more easily deformed than the take-out member and the output member with respect to an axial load, and has a function of absorbing deviation of an axial center between the take-out member and the output member and a function of converting a torque acting on the output member into an axial force to transmit the axial force to a take-out member side.

2. The friction transmission device according to claim 1, wherein the coupling has a coupling body disposed between the take-out member and the output member, and the coupling body has an axial length smaller than that of each of the take-out member and the output member or is made of a material having a Young's modulus smaller than that of each of the take-out member and the output member.

3. The friction transmission device according to claim 1, wherein the output member has a recessed portion having an inclined surface inclined with respect to the axial direction, and the coupling has a contact member that comes into contact with the inclined surface.

4. The friction transmission device according to claim 1, wherein the coupling makes the take-out member movable in a first direction perpendicular to the axial direction, and makes the output member movable in a second direction perpendicular to the axial direction and different from the first direction.

5. The friction transmission device according to claim 4, wherein the coupling has a coupling body, a first coupling recessed portion and a second coupling recessed portion provided in the coupling body, a first fitting member that fits into the first coupling recessed portion and a take-out member recessed portion provided in the take-out member with clearance in the first direction, and a second fitting member that fits into the second coupling recessed portion and an output member recessed portion provided in the output member with clearance in the second direction.

6. The friction transmission device according to claim 5, wherein at least one of the first coupling recessed portion and the second coupling recessed portion has an inclined surface inclined with respect to the axial direction, and
at least one of the first fitting member and the second fitting member comes into contact with the inclined surface.

7. The friction transmission device according to claim 1, wherein the friction transmission mechanism includes an input raceway ring, the plurality of friction rolling elements are planetary rolling elements that are disposed around a rotation axis of the input raceway ring and come into contact with the input raceway ring, and a first support raceway ring and a second support raceway ring that come into contact with the planetary rolling elements,
the planetary rolling elements are disposed so as to come into contact with the take-out member, and
a quadrangle is formed by extension lines of normal vectors at contact points between each of the planetary rolling elements and the respective raceway rings.

* * * * *